US012651841B2

(12) United States Patent
Hsiao et al.

(10) Patent No.: US 12,651,841 B2
(45) Date of Patent: Jun. 9, 2026

(54) ANTENNA DEVICE

(71) Applicant: CHENG UEI PRECISION INDUSTRY CO., LTD., New Taipei City (TW)

(72) Inventors: Lan-Yung Hsiao, New Taipei City (TW); Ping-Chun Lu, New Taipei City (TW); Shao-Kai Sun, New Taipei City (TW)

(73) Assignee: CHENG UEI PRECISION INDUSTRY CO., LTD., New Taipei City (TW)

( * ) Notice: Subject to any disclaimer, the term of this patent is extended or adjusted under 35 U.S.C. 154(b) by 289 days.

(21) Appl. No.: 18/651,675

(22) Filed: Apr. 30, 2024

(65) Prior Publication Data

US 2025/0023239 A1 Jan. 16, 2025

(30) Foreign Application Priority Data

Jul. 13, 2023 (CN) ......................... 202321833380.8

(51) Int. Cl.
*H01Q 9/42* (2006.01)
*H01Q 5/335* (2015.01)

(52) U.S. Cl.
CPC ............... *H01Q 9/42* (2013.01); *H01Q 5/335* (2015.01)

(58) Field of Classification Search
CPC ............. H01Q 5/335; H01Q 9/30; H01Q 9/42
See application file for complete search history.

(56) References Cited

U.S. PATENT DOCUMENTS 6,946,996 B2 * 9/2005 Koyama ................ H01Q 1/243
343/702

FOREIGN PATENT DOCUMENTS

EP 3716240 A1 * 9/2020 ............. G08B 17/00

* cited by examiner

*Primary Examiner* — Robert Karacsony
(74) *Attorney, Agent, or Firm* — Cheng-Ju Chiang

(57) ABSTRACT

An antenna device includes a circuit board, a matching circuit, a through hole and a radiant antenna. The circuit board includes a circuit layer. The circuit layer is disposed at a rear surface of the circuit board. The matching circuit is disposed to the circuit layer. The through hole longitudinally penetrates through the circuit board together with the circuit layer. The matching circuit is connected to the through hole. The radiant antenna is disposed at a front surface of the circuit board. The radiant antenna is inserted into the through hole. The radiant antenna includes a feed-in arm, a first radiant arm, a second radiant arm and a third radiant arm. The third radiant arm is intersected with the second radiant arm to form a bending angle between the third radiant arm and the second radiant arm. The bending angle is an obtuse angle.

14 Claims, 8 Drawing Sheets

ANTENNA DEVICE

CROSS REFERENCE TO RELATED APPLICATIONS

The present application is based on, and claims priority from, China Patent Application No. 202321833380.8, filed Jul. 13, 2023, the disclosure of which is hereby incorporated by reference herein in its entirety.

BACKGROUND OF THE INVENTION

Field of the Invention

The present invention generally relates to an antenna device, and more particularly to an antenna device which includes a matching circuit.

Description of Related Art

With the rapid development of mobile communication, various kinds of electronic devices gradually tend to be wireless. Simultaneously, people expect the electronic devices to be thinner, lighter, smaller and portable, so the portable electronic devices which are thinner, lighter and smaller become a market mainstream. Due to the above-mentioned reasons, sizes of the electronic devices are developed towards a miniaturized direction, and antennas which are disposed inside the electronic devices must be reduced accordingly, so demands for the antennas that are able to work stably in provided frequency bands and have the smaller sizes are increased. Because the antennas are developed towards the miniaturized direction, frequency bands and performances of the antennas will be affected. In order to compensate for influences of the frequency bands and performances of the antennas, matching circuits need designing.

Therefore, it is necessary to provide an innovative antenna device. The innovative antenna device includes a matching circuit. The innovative antenna device works in a limited space, and the innovative antenna device is able to stably work in the provided frequency bands.

BRIEF SUMMARY OF THE INVENTION

An object of the present invention is to provide an antenna device. The antenna device includes a circuit board, a matching circuit, a through hole and a radiant antenna. The circuit board includes a circuit layer. The circuit layer is disposed at a rear surface of the circuit board. The matching circuit is disposed to the circuit layer. The through hole penetrates through the circuit board together with the circuit layer. The matching circuit is connected to the through hole. The radiant antenna is disposed at a front surface of the circuit board. The radiant antenna is inserted into the through hole to be electrically connected to the matching circuit. The radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, the third radiant arm is intersected with the second radiant arm to form a bending angle between the third radiant arm and the second radiant arm, the bending angle is an obtuse angle.

Another object of the present invention is to provide an antenna device. The antenna device includes a circuit board, a matching circuit, a through hole and a radiant antenna. The circuit board includes a circuit layer. The circuit layer is disposed at a rear surface of the circuit board. The circuit layer is equipped with a feed-in source. The matching circuit is disposed to the circuit layer. The through hole penetrates through the circuit board together with the circuit layer. The matching circuit is connected to the through hole. The radiant antenna is disposed at a front surface of the circuit board. The radiant antenna is inserted into the through hole to be electrically connected to the matching circuit. The matching circuit is electrically connected between the feed-in source and the radiant antenna. The radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, the third radiant arm is intersected with the second radiant arm to form a bending angle between the third radiant arm and the second radiant arm, the bending angle is an obtuse angle.

Another object of the present invention is to provide an antenna device. The antenna device includes a circuit board, a matching circuit, a through hole and a radiant antenna. The circuit board includes a circuit layer. The circuit layer is disposed at a rear surface of the circuit board. The matching circuit is disposed to the circuit layer. The through hole penetrates through the circuit board together with the circuit layer. The matching circuit is connected to the through hole. The radiant antenna is disposed at a front surface of the circuit board. The radiant antenna is inserted into the through hole to be electrically connected to the matching circuit. The radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, a notch is formed at a junction area between the front end of the first radiant arm and the second radiant arm, the third radiant arm is intersected with the second radiant arm to form a bending angle between the third radiant arm and the second radiant arm, the bending angle is an obtuse angle.

As described above, the antenna device works in a limited space, the antenna device is able to stably work in a provided frequency band, so that the antenna device is able to appropriate to an electronic product miniaturization development trend and a wireless development trend.

BRIEF DESCRIPTION OF THE DRAWINGS

The present invention will be apparent to those skilled in the art by reading the following description, with reference to the attached drawings, in which.

DETAILED DESCRIPTION OF THE INVENTION

Figure 1:
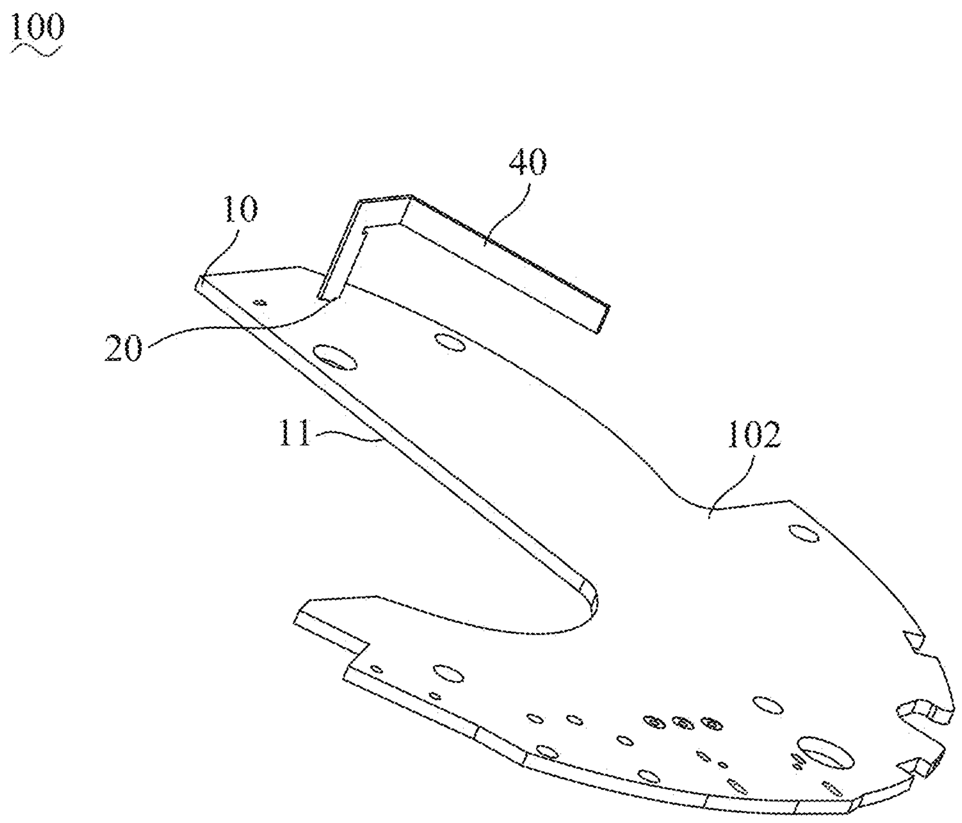
FIG. 1 is a perspective view of an antenna device according to a preferred embodiment of the present invention.
Figure 2:
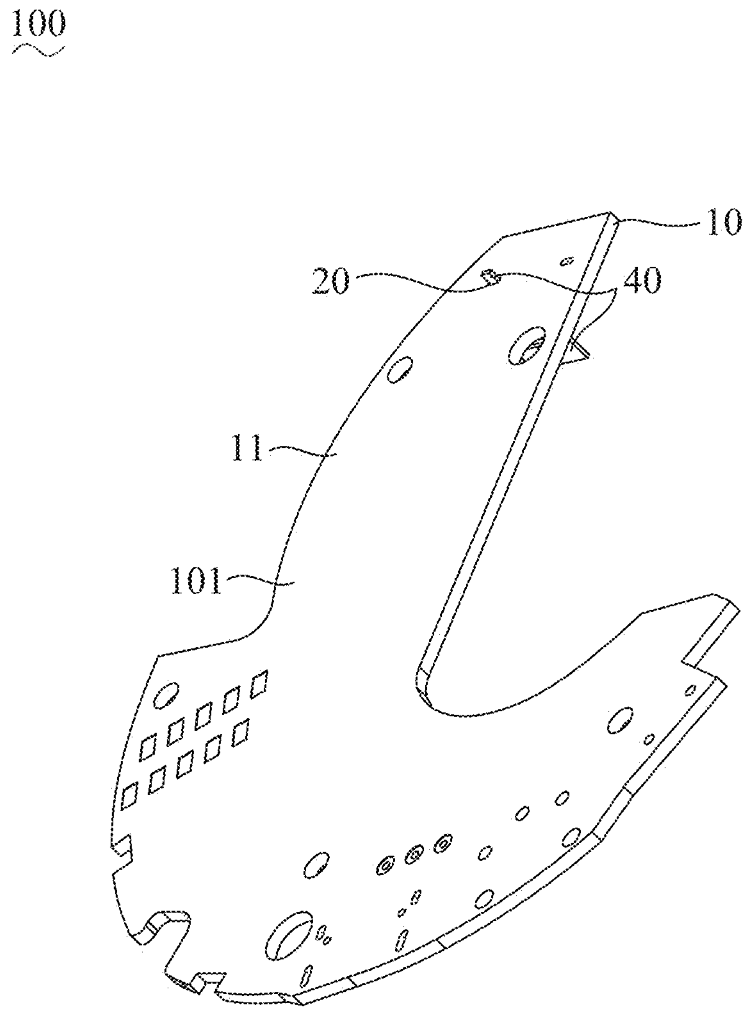
FIG. 2 is another perspective view of the antenna device according to the preferred embodiment of the present invention.

Referring to FIG. 1 to FIG. 4, an antenna device 100 according to a preferred embodiment of the present invention is shown. The antenna device 100 includes a circuit board 10, a through hole 20, a matching circuit 30 and a radiant antenna 40.

The circuit board 10 includes a circuit layer 11. In the preferred embodiment, the circuit layer 11 is disposed at a rear surface 101 of the circuit board 10. In a concrete implementation, the circuit layer 11 may also be positioned at a front surface 102 of the circuit board 10. The rear surface 101 and the front surface 102 of the circuit board 10 are parallel to each other. The matching circuit 30 is disposed to the circuit layer 11. The through hole 20 penetrates through the circuit board 10 together with the circuit layer 11. The matching circuit 30 is connected to the through hole 20. The radiant antenna 40 is arranged in the through hole 20, and the radiant antenna 40 is electrically connected to the matching circuit 30. The circuit layer 11 is equipped with a feed-in source 50.

Referring to FIG. 1 to FIG. 4, in the preferred embodiment, the matching circuit 30 is electrically connected between the feed-in source 50 and the radiant antenna 40. The matching circuit 30 includes a capacitor 31, an inductor 32 and an open end 33. The capacitor 31 is connected between the feed-in source 50 and the radiant antenna 40. One end of the inductor 32 is grounded, and the other end of the inductor 32 is connected between the radiant antenna 40 and the capacitor 31. One end of the open end 33 is grounded, and the other end of the open end 33 is connected between the feed-in source 50 and the capacitor 31. The matching circuit 30 further includes a first soldering group 34, a second soldering group 35 and a third soldering group 36. The first soldering group 34, the second soldering group 35 and the third soldering group 36 are all disposed to the circuit layer 11 of the circuit board 10.

The first soldering group 34 includes a first soldering point 34*a* and a second soldering point 34*b* positioned next to the first soldering point 34*a*. The first soldering point 34*a* is connected to the feed-in source 50. The second soldering point 34*b* is connected to a grounding portion (not shown) of the circuit layer 11 of the circuit board 10, so that the second soldering point 34*b* is grounded. The open end 33 is formed between the first soldering point 34*a* and the second soldering point 34*b*. The second soldering group 35 includes a third soldering point 35*a* and a fourth soldering point 35*b*. The third soldering point 35*a* is connected to the first soldering point 34*a*. Two sides of the capacitor 31 are connected to the third soldering point 35*a* and the fourth soldering point 35*b*. The third soldering group 36 includes a fifth soldering point 36*a* and a sixth soldering point 36*b*. The fifth soldering point 36*a* is connected between the fourth soldering point 35*b* and the radiant antenna 40. The fifth soldering point 36*a*, the fourth soldering point 35*b* and the radiant antenna 40 are connected together. The sixth soldering point 36*b* is connected to the grounding portion of the circuit layer 11 of the circuit board 10, so that the sixth soldering point 36*b* is grounded. Two ends of the inductor 32 are connected to the fifth soldering point 36*a* and the sixth soldering point 36*b*. The antenna device 100 is able to oscillate higher frequency band electromagnetic waves by a layout of the matching circuit 30.

Figure 3:
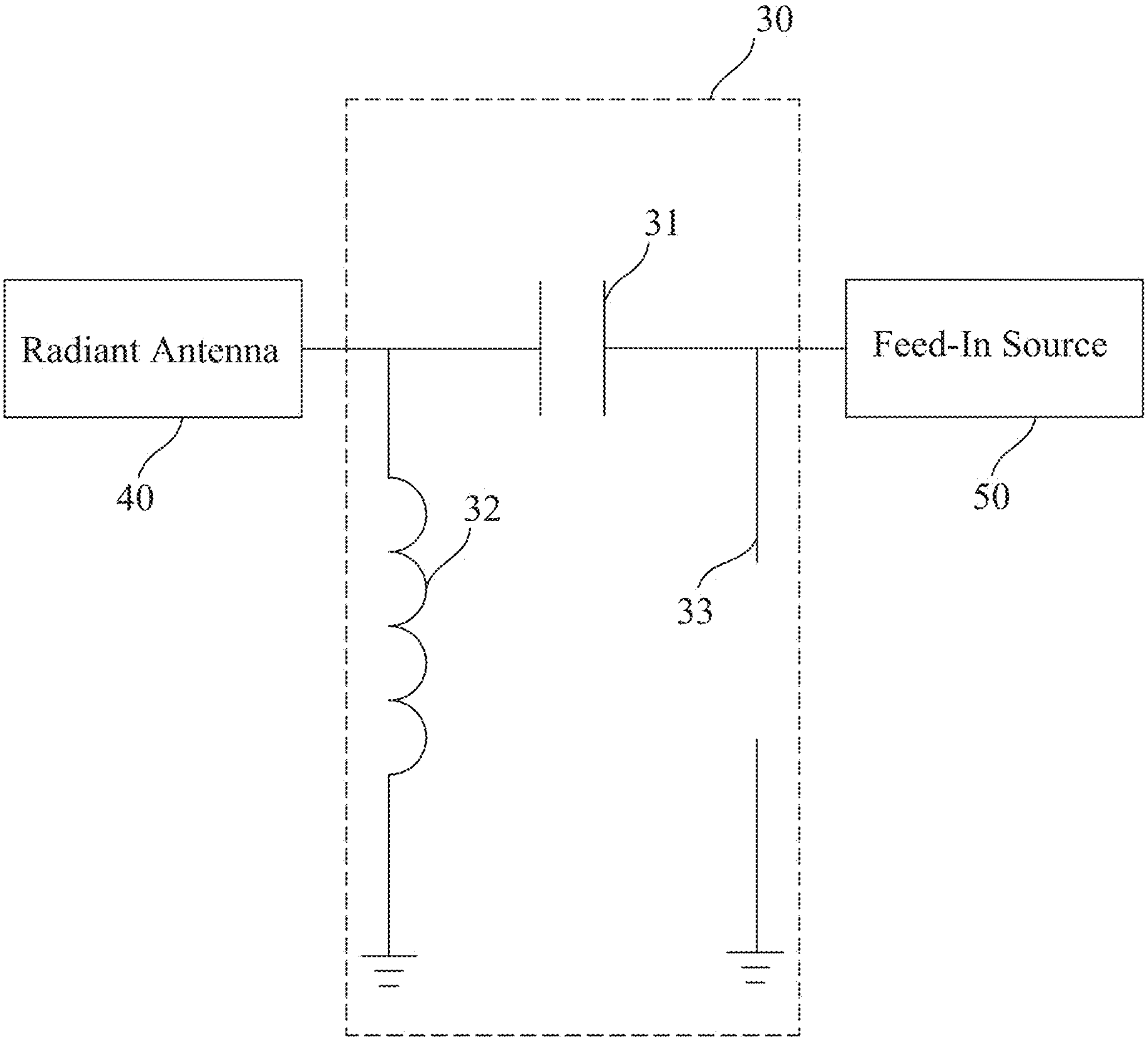
FIG. 3 is a circuit diagram of a matching circuit of the antenna device according to the preferred embodiment of the present invention.
Figure 4:
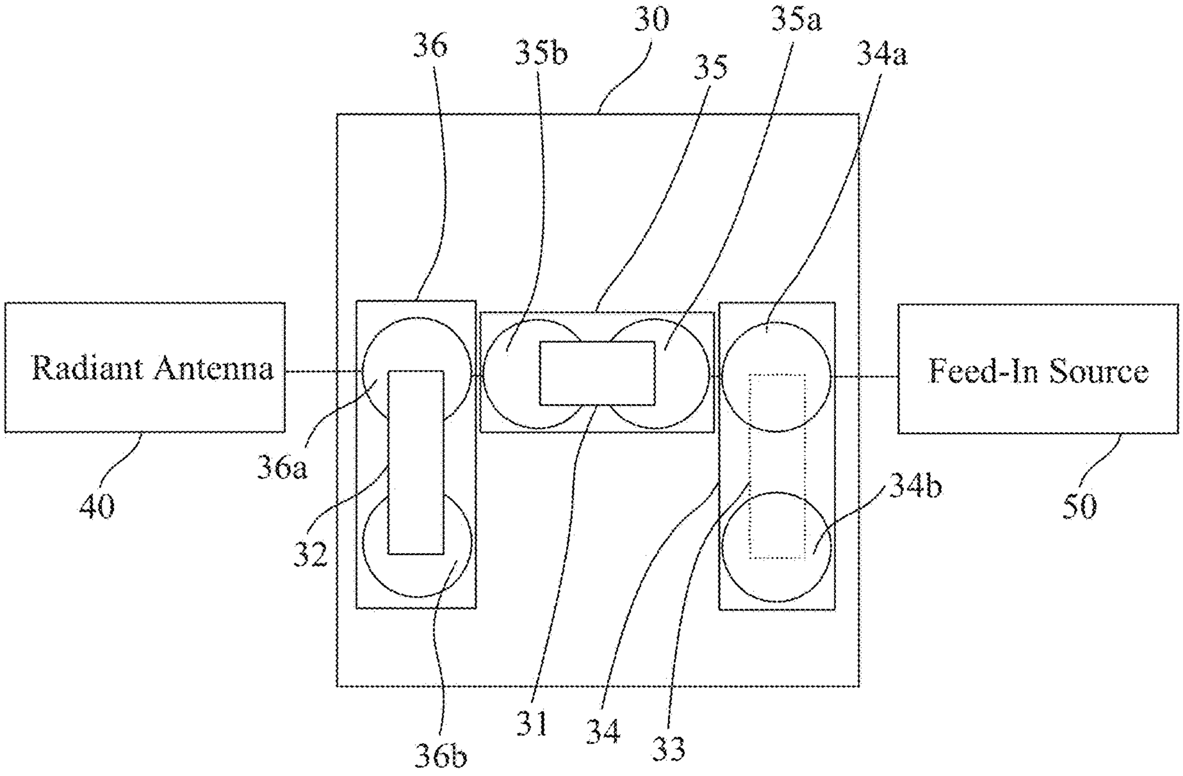
FIG. 4 shows a structure diagram of the matching circuit of the antenna device, wherein the matching circuit is disposed to a circuit board of the antenna device according to the preferred embodiment of the present invention.
Figure 5:
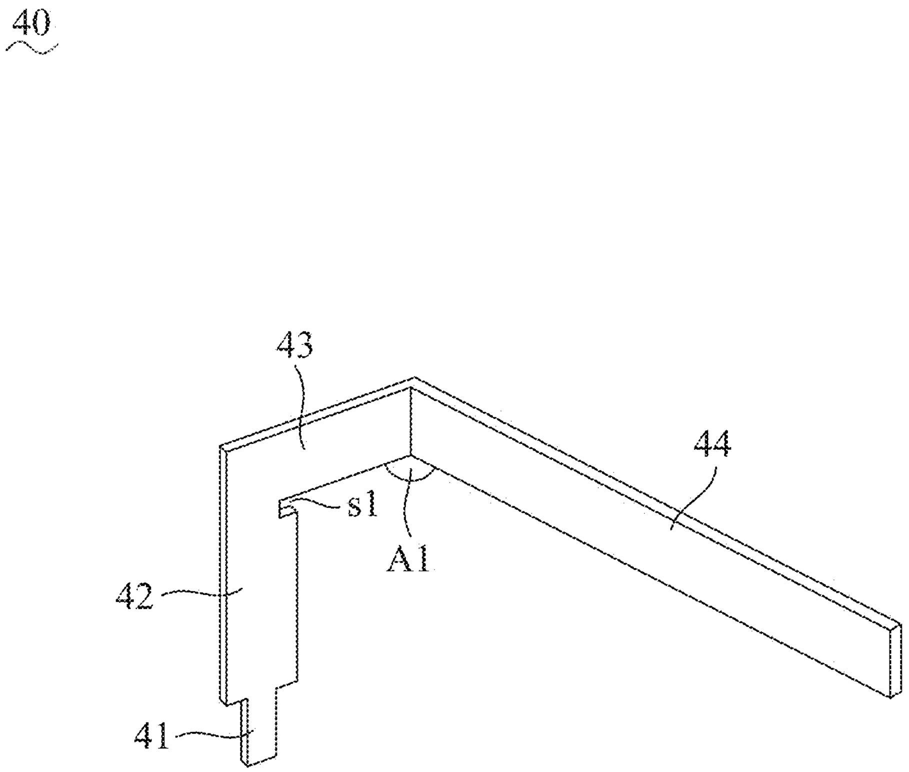
FIG. 5 is a perspective view of a radiant antenna of the antenna device according to the preferred embodiment of the present invention.

Referring to FIG. 3 to FIG. 5, the radiant antenna 40 is a monopole antenna. The radiant antenna 40 includes a feed-in arm 41, a first radiant arm 42, a second radiant arm 43 and a third radiant arm 44. The radiant antenna 40 is disposed at the front surface 102 of the circuit board 10. The radiant antenna 40 is inserted into the through hole 20 to be electrically connected to the matching circuit 30. The feed-in arm 41 is inserted into the through hole 20. The feed-in arm 41 is shown as a rectangular bar shape. The feed-in arm 41 is disposed perpendicular to the front surface 102 of the circuit board 10. Two sides of a front end of the feed-in arm 41 expand oppositely, and then extend frontward and perpendicular to the circuit board 10 to form the first radiant arm 42. The second radiant arm 43 is extended in a direction that is parallel to the circuit board 10 from a front end of the first radiant arm 42. The first radiant arm 42 and the second radiant arm 43 are located at the same plane. The third radiant arm 44 is straightly extended in the direction that is parallel to the circuit board 10 from a free end of the second radiant arm 43. The third radiant arm 44 is intersected with the second radiant arm 43 to form a bending angle A1 between the third radiant arm 44 and the second radiant arm 43. The first radiant arm 42 and the second radiant arm 43 form an inverted L shape. An extending path which is from the second radiant arm 43 to the third radiant arm 44 forms an approximately lying L shape. The bending angle A1 is an obtuse angle.

Referring to FIG. 5, in this preferred embodiment, a notch s1 is formed at a junction area between the front end of the first radiant arm 42 and the second radiant arm 43. The notch s1 faces the bending angle A1. A tail end of the third radiant arm 44 is suspended in air.

In this preferred embodiment, the radiant antenna 40 is formed into the first radiant arm 42, the second radiant arm 43 and the third radiant arm 44 by multiple bendings, so that an assembling space of the radiant antenna 40 is reduced to be used in various electronic devices (not shown). In order to make various performances of the antenna device 100 be better, the various performances of the antenna device 100 are a voltage standing wave ratio (VSWR), a field pattern and reflection loss and so on. Under a premise of being within the assembling space of the radiant antenna 40, the third radiant arm 44 of the radiant antenna 40 is lengthened as far as possible, and the bending angle A1 is promoted as large as possible.

Referring to FIG. 1 to FIG. 5, in order to make the antenna device 100 have better antenna characteristics and smaller sizes, the capacitor 31 has a capacitance value of 1.5 picofarads (pF). The inductor 32 has an inductance value of 4.7 nanohenries (nH). A length of the third radiant arm 44 is 12 millimeters. An angle of the bending angle A1 is 107.4 degrees. Electric fields and magnetic fields of the matching circuit 30 and the radiant antenna 40 are mutually transmitted, and the electric fields and magnetic fields of the matching circuit 30 and the radiant antenna 40 are mutually affected to oscillate electromagnetic waves in a frequency band which is ranged from 2.4 GHz to 2.5 GHz.

Referring to FIG. 3 to FIG. 5, when the antenna device 100 is used for wireless communication, a current is fed through the feed-in source 50 which is located at the circuit layer 11. The current passes through the matching circuit 30, and then the current passes through the through hole 20 to flow through the feed-in arm 41, the first radiant arm 42, the second radiant arm 43 and the third radiant arm 44 so as to oscillate the frequency band which is ranged from 2.4 GHz to 2.5 GHz. So the antenna device 100 works in a limited space, and the antenna device 100 is able to stably work in the provided frequency band.

Figure 6:
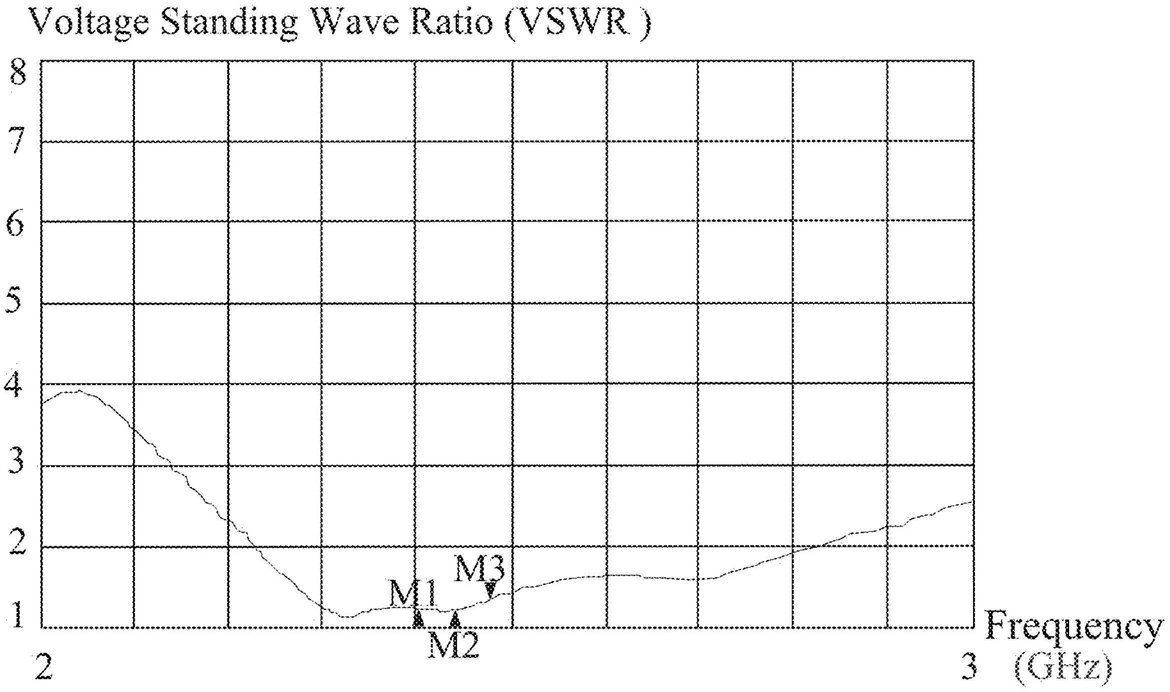
FIG. 6 is a voltage standing wave ratio (VSWR) test chart of the antenna device according to the preferred embodiment of the present invention.
Figure 7:
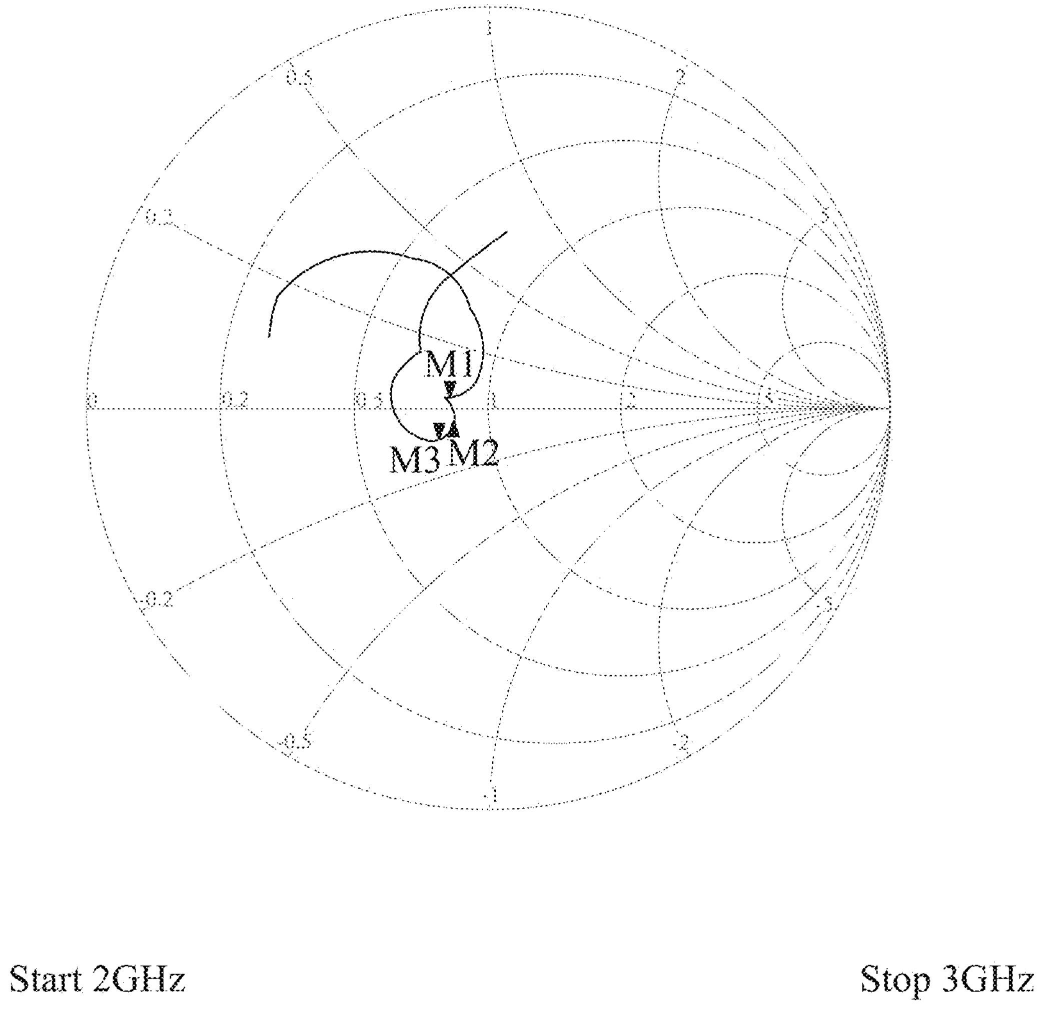
FIG. 7 is a smith chart of the antenna device according to the preferred embodiment of the present invention.

Referring to FIG. 1, FIG. 6, FIG. 7 and FIG. 8, a voltage standing wave ratio (VSWR) test chart of the antenna device 100 is shown in FIG. 6. A smith chart of the antenna device 100 is shown in FIG. 7. When the antenna device 100 is operated at 2.402 GHz, a VSWR value of the antenna device 100 is 1.2350 which is shown at a position M1 of FIG. 6. When the antenna device 100 is operated at 2.441 GHz, a VSWR value of the antenna device 100 is 1.2100 which is shown at a position M2 of FIG. 6. When the antenna device 100 is operated at 2.48 GHz, a VSWR value of the antenna device 100 is 1.3432 which is shown at a position M3 of FIG. 6. Therefore, the antenna device 100 according to the present invention is able to be stably operated in the frequency band which is ranged from 2.4 GHz to 2.5 GHz.

Figure 8:
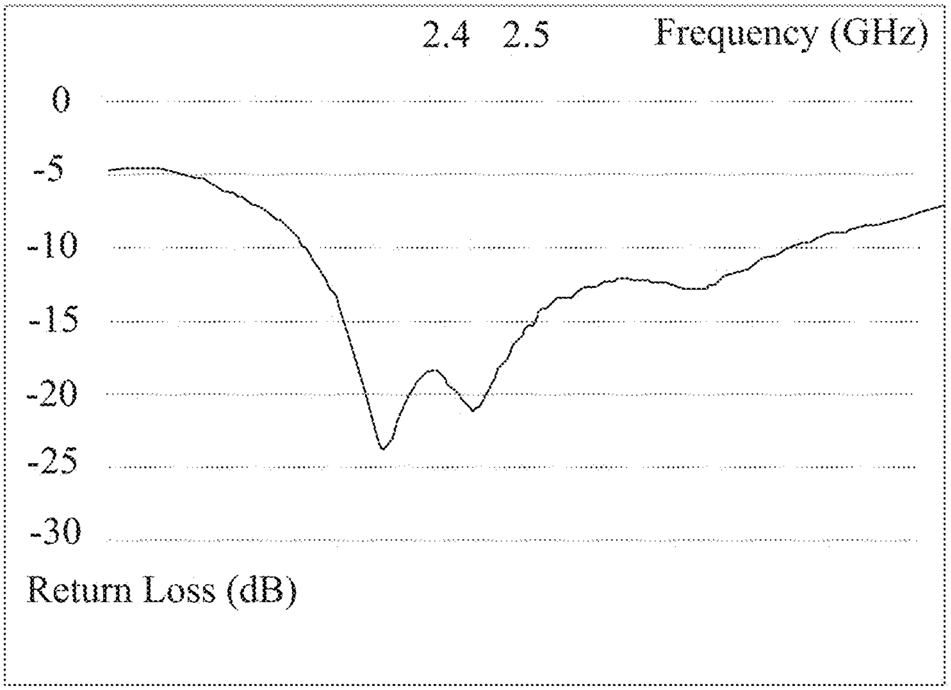
FIG. 8 is a return loss chart of the antenna device according to the preferred embodiment of the present invention.

Referring to FIG. 1 and FIG. 8, when the antenna device 100 is operated at the frequency band which is ranged from 2.4 GHz to 2.5 GHz, a return loss of a bandwidth of the antenna device 100 is approximately within −20 dB, so a loss degree of the antenna device 100 is small, and a radiation energy of the antenna device 100 is large.

As described above, the antenna device 100 works in the limited space, the antenna device 100 is able to stably work in the provided frequency band, so that the antenna device 100 is able to appropriate to an electronic product miniaturization development trend and a wireless development trend.

Though the present invention is disclosed as the above-mentioned preferred embodiment, the preferred embodiment disclosed in this invention is without being intended to limit a scope of this invention. In related technical fields, anyone with ordinary knowledges should be able to make a few changes and embellishments within a spirit and a protection scope of this invention, so the protection scope of this invention should regard defined claims of an attached application patent as a standard.

What is claimed is:

1. An antenna device, comprising:

a circuit board which includes a circuit layer, the circuit layer being disposed at a rear surface of the circuit board;

a matching circuit disposed to the circuit layer;

a through hole penetrating through the circuit board together with the circuit layer, the matching circuit being connected to the through hole; and a radiant antenna disposed at a front surface of the circuit board, the radiant antenna being inserted into the through hole to be electrically connected to the matching circuit;

wherein the radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, the third radiant arm is intersected with the second radiant arm to form a bending angle between the third radiant arm and the second radiant arm, the bending angle is an obtuse angle.

2. The antenna device as claimed in claim 1, wherein a notch is formed at a junction area between the front end of the first radiant arm and the second radiant arm.

3. The antenna device as claimed in claim 1, wherein a tail end of the third radiant arm being suspended in air.

4. The antenna device as claimed in claim 1, wherein the matching circuit is electrically connected between a feed-in source and the radiant antenna, the matching circuit includes a capacitor, an inductor and an open end, the capacitor is connected between the feed-in source and the radiant antenna, one end of the inductor is grounded, and the other end of the inductor is connected between the radiant antenna and the capacitor, one end of the open end is grounded, and the other end of the open end is connected between the feed-in source and the capacitor.

5. The antenna device as claimed in claim 4, wherein the matching circuit includes a first soldering group, a second soldering group and a third soldering group, the first soldering group, the second soldering group and the third soldering group are all disposed to the circuit layer of the circuit board.

6. The antenna device as claimed in claim 5, wherein the first soldering group includes a first soldering point and a second soldering point positioned next to the first soldering point, the first soldering point is connected to the feed-in source, the second soldering point is grounded, the open end is formed between the first soldering point and the second soldering point.

7. The antenna device as claimed in claim 6, wherein the second soldering group includes a third soldering point and a fourth soldering point, the third soldering point is connected to the first soldering point, two sides of the capacitor are connected to the third soldering point and the fourth soldering point.

8. The antenna device as claimed in claim 7, wherein the third soldering group includes a fifth soldering point and a sixth soldering point, the fifth soldering point is connected between the fourth soldering point and the radiant antenna, the sixth soldering point is grounded, two ends of the inductor are connected to the fifth soldering point and the sixth soldering point.

9. The antenna device as claimed in claim 1, wherein the first radiant arm and the second radiant arm are located at the same plane.

10. The antenna device as claimed in claim 1, wherein the first radiant arm and the second radiant arm form an inverted L shape.

11. The antenna device as claimed in claim 1, wherein an extending path which is from the second radiant arm to the third radiant arm forms a lying L shape.

12. The antenna device as claimed in claim 1, wherein the antenna device is able to oscillate higher frequency band electromagnetic waves by a layout of the matching circuit.

13. An antenna device, comprising:

a circuit board which includes a circuit layer, the circuit layer being disposed at a rear surface of the circuit board, the circuit layer being equipped with a feed-in source;

a matching circuit disposed to the circuit layer;

a through hole penetrating through the circuit board together with the circuit layer, the matching circuit being connected to the through hole; and a radiant antenna disposed at a front surface of the circuit board, the radiant antenna being inserted into the through hole to be electrically connected to the matching circuit, the matching circuit being electrically connected between the feed-in source and the radiant antenna;

wherein the radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, the third radiant arm is intersected with the second radiant arm to form a bending angle between the third radiant arm and the second radiant arm, the bending angle is an obtuse angle.

14. An antenna device, comprising:

a circuit board which includes a circuit layer, the circuit layer being disposed at a rear surface of the circuit board;

a matching circuit disposed to the circuit layer;

a through hole penetrating through the circuit board together with the circuit layer, the matching circuit being connected to the through hole; and a radiant antenna disposed at a front surface of the circuit board, the radiant antenna being inserted into the through hole to be electrically connected to the matching circuit;

wherein the radiant antenna includes a feed-in arm, a first radiant arm, a second radiant arm and a third radiant arm, the feed-in arm is inserted into the through hole, two sides of a front end of the feed-in arm expand oppositely, and then extend frontward and perpendicular to the circuit board to form the first radiant arm, the second radiant arm is extended in a direction that is parallel to the circuit board from a front end of the first radiant arm, the third radiant arm is straightly extended in the direction that is parallel to the circuit board from a free end of the second radiant arm, a notch is formed at a junction area between the front end of the first radiant arm and the second radiant arm, the third radiant arm is intersected with the second radiant arm to form a bending angle between the third radiant arm and the second radiant arm, the bending angle is an obtuse angle.

* * * * *